United States Patent
Bailey et al.

(10) Patent No.: US 12,379,106 B2
(45) Date of Patent: Aug. 5, 2025

(54) METHOD FOR FORMING A GAS BURNER MEMBRANE

(71) Applicant: BECKETT THERMAL SOLUTIONS LTD., Alfreton (GB)

(72) Inventors: Anthony Bailey, Alfreton (GB); Darren Flint, Alfreton (GB); Craig Stuart Orson, Alfreton (GB); David Michael Bruce Killer, Alfreton (GB)

(73) Assignee: Beckett Thermal Solutions Ltd., Alfreton (GB)

( * ) Notice: Subject to any disclaimer, the term of this patent is extended or adjusted under 35 U.S.C. 154(b) by 257 days.

(21) Appl. No.: 17/286,354

(22) PCT Filed: Oct. 17, 2019

(86) PCT No.: PCT/GB2019/052975
§ 371 (c)(1),
(2) Date: Apr. 16, 2021

(87) PCT Pub. No.: WO2020/079445
PCT Pub. Date: Apr. 23, 2020

(65) Prior Publication Data
US 2021/0348755 A1  Nov. 11, 2021

(30) Foreign Application Priority Data

Oct. 17, 2018  (GB) ..................... 1816874
Oct. 17, 2018  (GB) ..................... 1816875

(Continued)

(51) Int. Cl.
*F23D 14/02*  (2006.01)
*B23K 26/06*  (2014.01)

(Continued)

(52) U.S. Cl.
CPC .......... *F23D 14/02* (2013.01); *B23K 26/0604* (2013.01); *B23K 26/389* (2015.10);
(Continued)

(58) Field of Classification Search
CPC . F23D 14/02; F23D 2203/102; B23K 26/389; B23K 26/0604; F23C 7/00; F23C 2900/9901
(Continued)

(56) References Cited

U.S. PATENT DOCUMENTS

2001/0036610 A1* 11/2001 Wood ..................... F23D 14/145
431/328
2006/0141412 A1* 6/2006 Masten ................. F23D 14/145
431/326

(Continued)

FOREIGN PATENT DOCUMENTS

EP    2942564 B1    12/2016
WO    1993018342 A1    2/1999

OTHER PUBLICATIONS

Written Opinion of the International Searching Authority issued in PCT/GB2019/052975, date of mailing Jan. 8, 2020.
(Continued)

*Primary Examiner* — Avinash A Savani
(74) *Attorney, Agent, or Firm* — Conley Rose, P.C.

(57) ABSTRACT

A method of forming a gas burner membrane. The method comprises forming a plurality of holes in a sheet of material. The holes are formed by laser cutting a required pattern of holes in the sheet of material.

17 Claims, 5 Drawing Sheets

(30) Foreign Application Priority Data

Oct. 17, 2018 (GB) ...................................... 1816877
Oct. 17, 2018 (GB) ...................................... 1816878

(51) Int. Cl.
 *B23K 26/382* (2014.01)
 *F23C 7/00* (2006.01)
 *B23K 103/04* (2006.01)

(52) U.S. Cl.
 CPC ............ *F23C 7/00* (2013.01); *B23K 2103/05* (2018.08); *F23C 2900/9901* (2013.01); *F23D 2203/102* (2013.01)

(58) Field of Classification Search
 USPC ........................................................ 431/326
 See application file for complete search history.

(56) References Cited

U.S. PATENT DOCUMENTS

| | | | | |
|---|---|---|---|---|
| 2006/0251998 | A1* | 11/2006 | Lamberts | F23D 14/145 431/350 |
| 2006/0286498 | A1* | 12/2006 | Trimis | F23C 99/006 431/354 |
| 2008/0223835 | A1* | 9/2008 | Kuhn | B23K 26/389 219/121.71 |
| 2010/0248173 | A1* | 9/2010 | Ehara | F23D 5/04 431/211 |
| 2011/0244411 | A1* | 10/2011 | Rochat | F23D 14/10 431/354 |
| 2015/0167967 | A1* | 6/2015 | Le Mer | F23D 14/145 431/328 |
| 2016/0230985 | A1 | 8/2016 | Home | |
| 2017/0122555 | A1* | 5/2017 | Owens | F23D 14/18 |

OTHER PUBLICATIONS

Notification of Transmittal of the International Search Report issued in PCT/GB2019/052975, date of mailing Jan. 8, 2020.

* cited by examiner

METHOD FOR FORMING A GAS BURNER MEMBRANE

CROSS-REFERENCE TO RELATED APPLICATIONS

This application is a U.S. 371 of International Application No. PCT/GB2019/052975, filed Oct. 17, 2019, which application claims the benefit of GB Application No. 1816878.1, filed Oct. 17, 2018, GB Application No. 1816874.0, filed Oct. 17, 2018, GB Application No. 1816875.7, filed Oct. 17, 2018; and GB Application No. 1816877.3, filed Oct. 17, 2018, the entire contents of which are hereby incorporated in their entirety for all purposes.

This invention concerns, a gas burner membrane, a gas burner, and a method of forming a gas burner membrane.

In gas burners for instance in boilers, cookers or gas fires, a burner membrane is usually provided which has a pattern of through holes through which a mixture of gas and air pass. The mixture is ignited on an outer side of the membrane. Burner membranes may also be called flame strips, flame skins, burner skins or burner heads. A required size and pattern/density of through holes is required to provide efficient burning on the outer side of the burner membrane, and to retain the burning on the outer side of the burner membrane at a required space therefrom.

Conventionally gases such as methane have been used in gas burners in a number of locations. The holes in burner membranes for use with such gases are generally made using traditional sheet metal piercing techniques. Such techniques can only be used with holes above a minimum size, which size is generally around 1.5 times the material's thickness. In some instances using traditional sheet metal piercing techniques, it may be possible to produce holes at a size of 1.3 to 1.5 times the material thickness, but this is considered bad practice. Producing holes at sizes less than 1.3 times the material thickness would result in a high failure rate of the product or tooling. Also, the density of through holes made by such techniques is limited.

In some instances different gases could be used in gas burners, such as hydrogen or a hydrogen rich mixture.

According to some, but not necessarily all, aspects of the invention is provided a method of forming a gas burner membrane, the method comprising forming a plurality of holes in a sheet of material, the holes being formed by laser cutting a required pattern of holes in the sheet of material.

At least a majority of the holes may have a diameter equal to or less than 1.3 times the thickness of the sheet of material. Possibly, at least a majority of the holes may have a diameter equal to or less than the thickness of the sheet of material. Possibly, at least a majority of the holes may have a diameter which is less than 0.75 times the thickness of the sheet of material. Possibly, at least at least a majority of the holes may have a diameter of between 0.1 and 1 mm. Possibly, at least a majority of the holes may have a diameter of between 0.25 mm and 0.75 mm. Preferably, at least a majority of the holes may have a diameter of substantially 0.5 mm.

Possibly, the sheet of material may have a thickness of between 0.3 and 3 mm. Possibly, the sheet may have a thickness of between 0.4 and 1.5 mm. Preferably, the sheet may have a thickness of 0.6 mm.

The sheet of material may be of a metal, may be stainless steel, and may be ferritic stainless steel.

The laser cutting of the required pattern of holes may comprise at least one of: single beam laser cutting or multi beam laser cutting.

The laser cutting may comprise laser drilling.

Between 500 and 10000 holes may be formed in the burner membrane 14, and preferably between 1000 and 2000 holes may be formed.

According to some, but not necessarily all, aspects of the invention there is provided a method of forming a gas burner membrane, the method comprising forming a plurality of holes in a sheet of material, the holes being formed by water jet cutting a required pattern of holes in the sheet of material.

At least a majority of the holes may have a diameter equal to or less than 1.3 times the thickness of the sheet of material. Possibly, at least a majority of the holes may have a diameter equal to or less than the thickness of the sheet of material. Possibly, at least a majority of the holes may have a diameter which is less than 0.75 times the thickness of the sheet of material. Possibly, at least at least a majority of the holes may have a diameter of between 0.1 and 1 mm. Possibly, at least a majority of the holes may have a diameter of between 0.25 mm and 0.75 mm. Preferably, at least a majority of the holes may have a diameter of substantially 0.5 mm.

Possibly, the sheet of material may have a thickness of between 0.3 and 3 mm. Possibly, the sheet may have a thickness of between 0.4 and 1.5 mm. Preferably, the sheet may have a thickness of 0.6 mm.

The sheet of material may be of a metal, may be stainless steel, and may be ferritic stainless steel.

An abrasive material may be included in the water jet.

Between 500 and 10000 holes may be formed in the burner membrane 14, and preferably between 1000 and 2000 holes may be formed.

According to some, but not necessarily all, aspects of the invention there is provided a method of forming a gas burner membrane, the method comprising forming a plurality of holes in a sheet of material, the holes being formed by electron beam drilling a required pattern of holes in the sheet of material.

At least a majority of the holes may have a diameter equal to or less than 1.3 times the thickness of the sheet of material. Possibly, at least a majority of the holes may have a diameter equal to or less than the thickness of the sheet of material. Possibly, at least a majority of the holes may have a diameter which is less than 0.75 times the thickness of the sheet of material. Possibly, at least at least a majority of the holes may have a diameter of between 0.1 and 1 mm. Possibly, at least a majority of the holes may have a diameter of between 0.25 mm and 0.75 mm. Preferably, at least a majority of the holes may have a diameter of substantially 0.5 mm.

Possibly, the sheet of material may have a thickness of between 0.3 and 3 mm. Possibly, the sheet may have a thickness of between 0.4 and 1.5 mm. Preferably, the sheet may have a thickness of 0.6 mm.

The sheet of material may be of a metal, may be stainless steel, and may be ferritic stainless steel.

Between 500 and 10000 holes may be formed in the burner membrane 14, and preferably between 1000 and 2000 holes may be formed.

According to some, but not necessarily all, aspects of the invention there is provided a method of forming a gas burner membrane, the method comprising forming a plurality of holes in a sheet of material, the holes being formed by chemical etching a required pattern of holes in the sheet of material.

At least a majority of the holes may have a diameter equal to or less than 1.3 times the thickness of the sheet of material. Possibly, at least a majority of the holes may have a diameter equal to or less than the thickness of the sheet of material. Possibly, at least a majority of the holes may have a diameter which is less than 0.75 times the thickness of the sheet of material. Possibly, at least at least a majority of the holes may have a diameter of between 0.1 and 1 mm. Possibly, at least a majority of the holes may have a diameter of between 0.25 mm and 0.75 mm. Preferably, at least a majority of the holes may have a diameter of substantially 0.5 mm.

Possibly, the sheet of material may have a thickness of between 0.3 and 3 mm. Possibly, the sheet may have a thickness of between 0.4 and 1.5 mm. Preferably, the sheet may have a thickness of 0.6 mm.

The sheet of material may be of a metal, may be stainless steel, and may be ferritic stainless steel.

The chemical etching may include forming a layer of photosensitive material on the sheet of material, a pattern of light on the layer of photosensitive material to leave a required configuration of exposed and unexposed material on the sheet of material, removing the unexposed material to reveal a pattern of bare material, and removing the bare material by etching to form a require pattern of through holes in the sheet of material.

The etching may be carried out using an acid.

The etching may be carried out by spraying an etching liquid onto the sheet of material.

The photosensitive material may be exposed using UV light.

The sheet of material may be cleaned and degreased prior to forming of the photosensitive material layer.

The exposed photosensitive material may be removed from the sheet of material after etching.

Between 500 and 10000 holes may be formed in the burner membrane 14, and preferably between 1000 and 2000 holes may be formed.

According to some, but not necessarily all, aspects of the invention there is provided a method of forming a gas burner comprising the method of forming a gas burner membrane of any of the preceding paragraphs, and providing a hydrogen gas supply.

The hydrogen gas supply may be a pure hydrogen gas supply or a hydrogen blend gas supply, wherein the hydrogen blend includes at least 80 vol. % hydrogen gas.

According to some, but not necessarily all, aspects of the invention there is provided a gas burner membrane made by a method according to any of the preceding paragraphs.

According to some, but not necessarily all, aspects of the invention there is provided a gas burner incorporating such a gas burner membrane.

According to some, but not necessarily all, aspects of the invention there is provided a gas burner membrane comprising a sheet of material with a plurality of holes, with at least a majority of the holes having a diameter equal to or less than 1.3 times the thickness of the sheet of material.

Possibly, at least a majority of the holes may have a diameter equal to or less than the thickness of the sheet of material. Possibly, at least a majority of the holes may have a diameter which is less than 0.75 times the thickness of the sheet of material. Possibly, at least at least a majority of the holes may have a diameter of between 0.1 and 1 mm. Possibly, at least a majority of the holes may have a diameter of between 0.25 mm and 0.75 mm. Preferably, at least a majority of the holes may have a diameter of substantially 0.5 mm.

Possibly, the sheet of material may have a thickness of between 0.3 and 3 mm. Possibly, the sheet may have a thickness of between 0.4 and 1.5 mm. Preferably, the sheet may have a thickness of 0.6 mm.

The sheet of material may be of a metal, may be stainless steel, and may be ferritic stainless steel.

Between 500 and 10000 holes may be formed in the burner membrane 14, and preferably between 1000 and 2000 holes may be formed.

According to some, but not necessarily all, aspects of the invention there is provided a gas burner including: a gas burner membrane comprising a sheet of material with a plurality of holes, with at least a majority of the holes having a diameter equal to or less than 1.3 times the thickness of the sheet of material; and a hydrogen gas supply.

The hydrogen gas supply may be a pure hydrogen gas supply or a hydrogen blend gas supply, wherein the hydrogen blend includes at least 80 vol. % hydrogen gas.

The gas burner may further comprise a mixing chamber to receive gas from the hydrogen gas supply. The burner membrane may be positioned above the mixing chamber.

The gas burner may further comprise a fan configured to blow air into the mixing chamber.

Embodiments of the present invention will now be described by way of example only, and with reference to the accompanying figures, in which:

FIG. 1 schematically shows a gas burner according to the invention;

FIG. 2 schematically shows a further gas burner according to the invention;

FIG. 3 schematically shows a yet further gas burner according to the invention;

Figure 1:
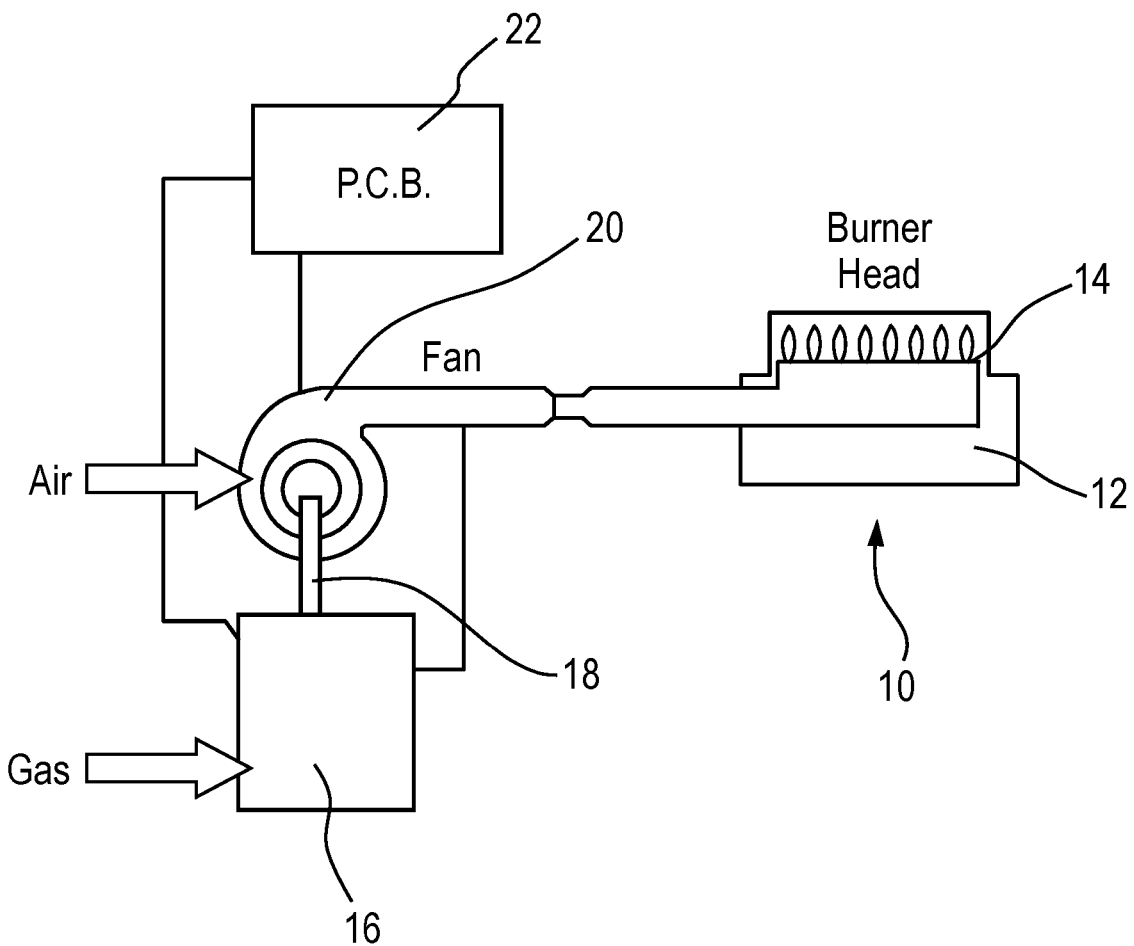

FIG. 1 shows a typical gas burner 10 with a mixing chamber 12 with a burner membrane 14 on top. Air and gas is blown into the mixing chamber 12 using a fan 20. The gas is supplied to the fan 20 via a pipe 18 from a supply 16. The burner 10 is controlled by a control unit 22. The fan 20 could for instance operate at 2000 rpm at 5 kW.

Figure 2:
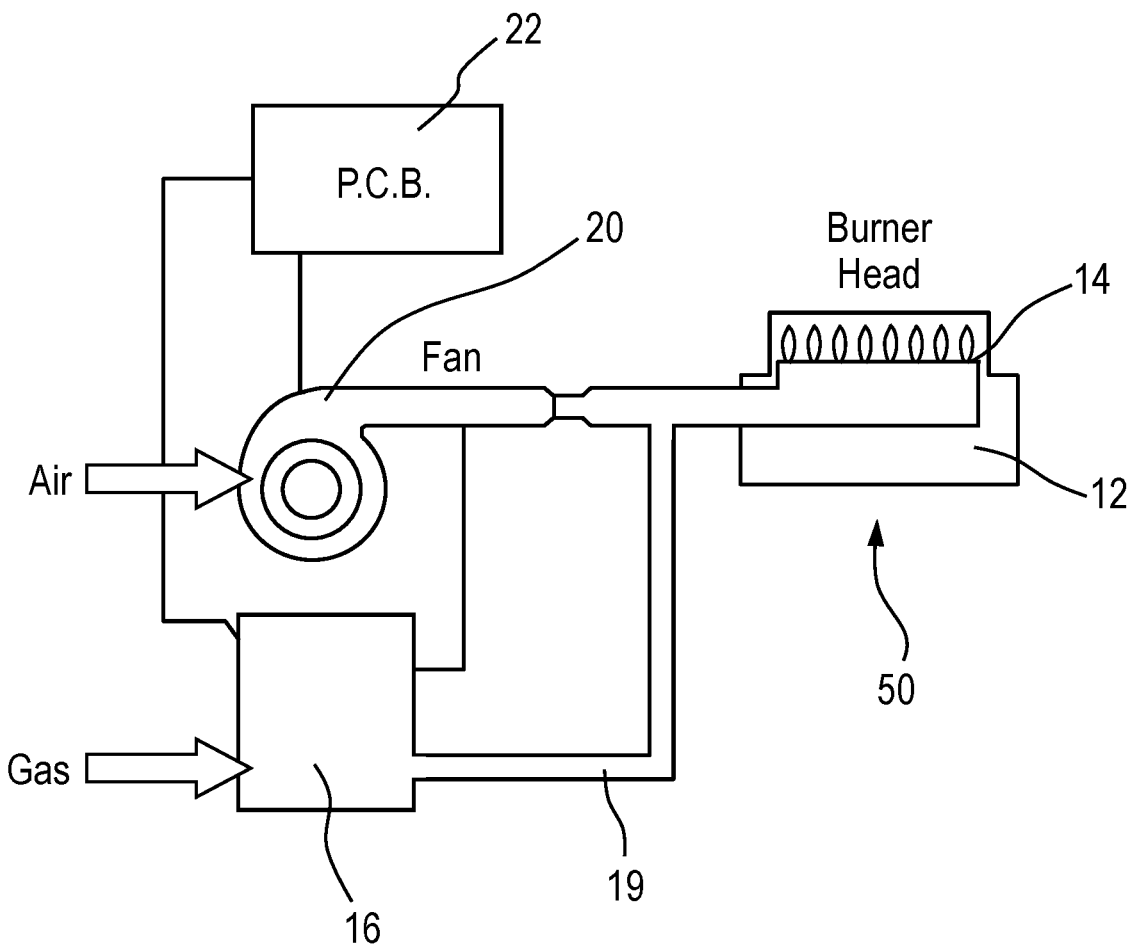

FIG. 2 shows a further typical gas burner 50 with the mixing chamber 12 with the burner membrane 14 on top. The mixing chamber 12 receives gas directly from a supply 16 via a pipe 19, without passing through the fan 20. Air is blown into the mixing chamber 12 using the fan 20, and the burner 10 is controlled by the control unit 22.

Figure 3:
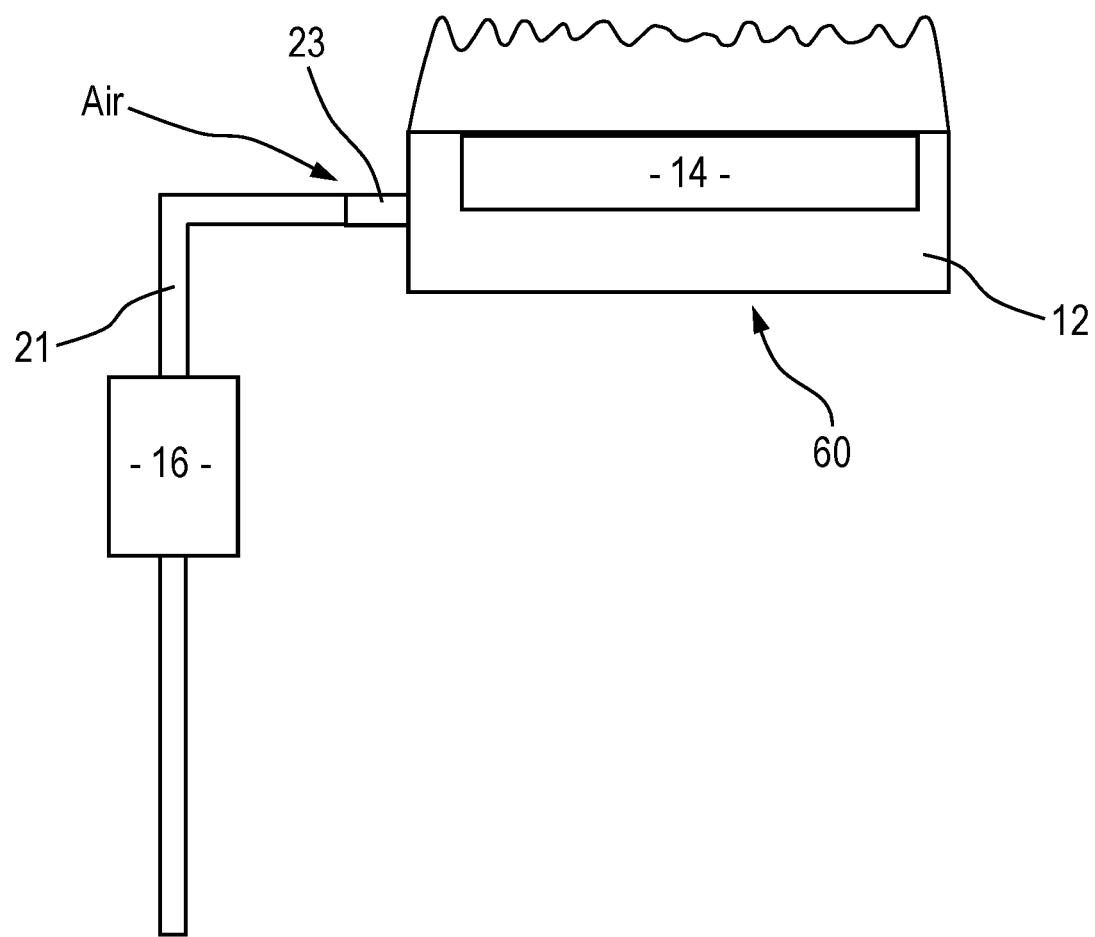
Figure 4:
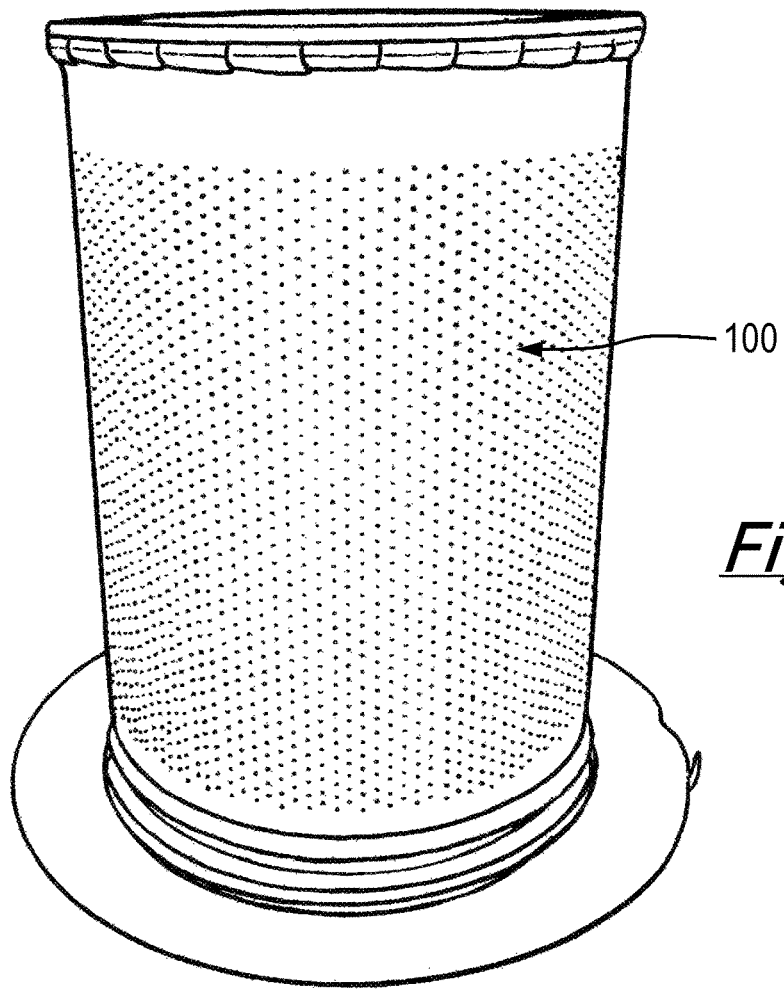
FIG. 4 is a picture showing an example natural gas burner membrane.
Figure 5:
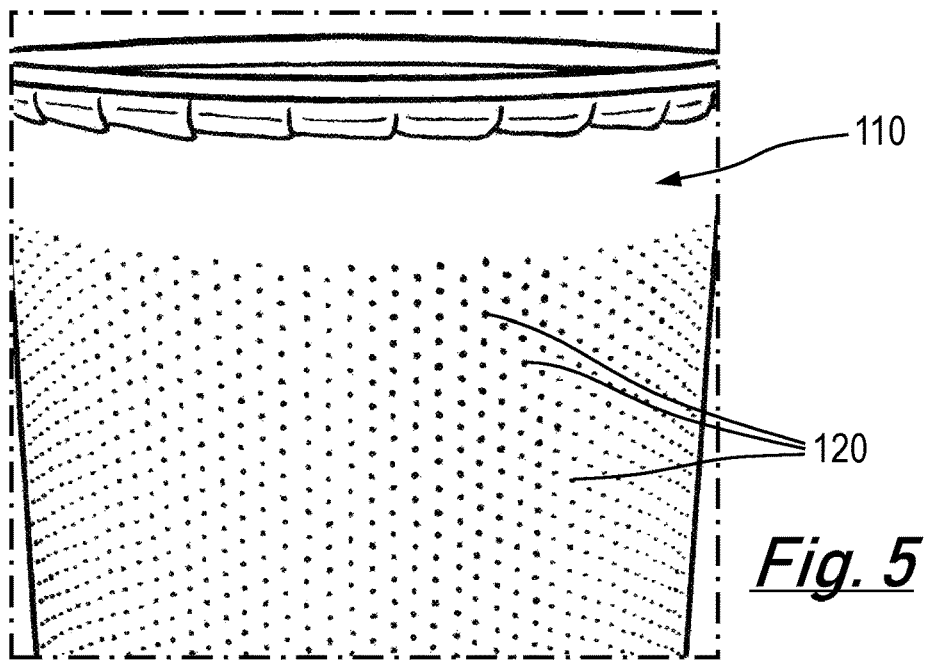
FIG. 5 is a picture showing a closer view of the holes in the example natural gas burner membrane of FIG. 4.
Figure 6:
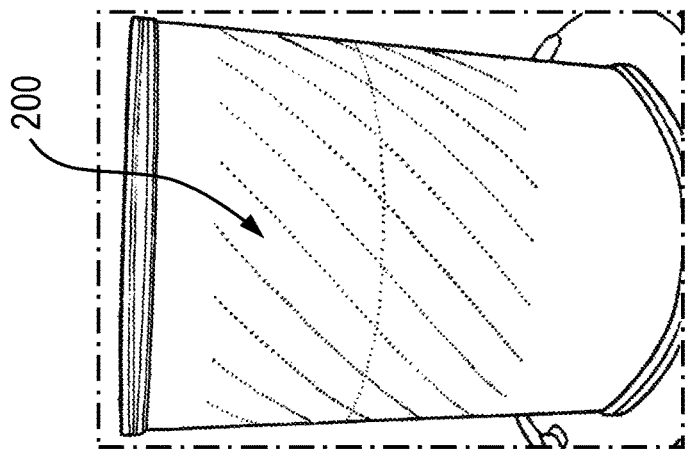
FIG. 6 is a picture showing an example gas burner membrane according to the invention.
Figure 7:
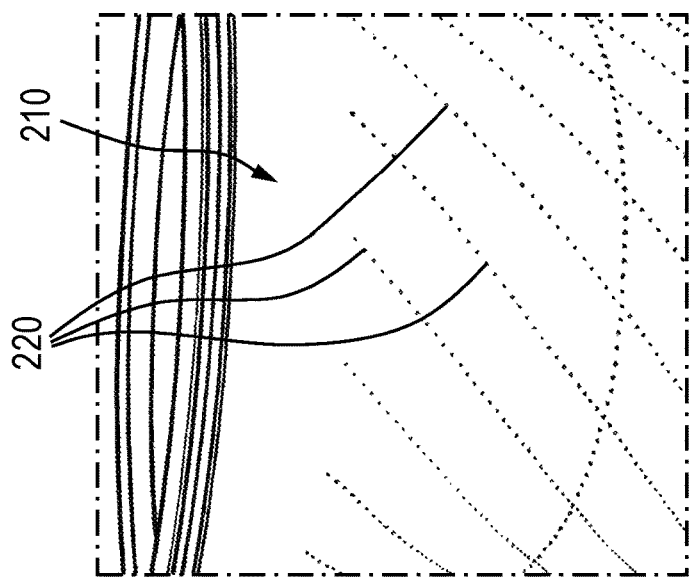
FIG. 7 is a picture showing a closer view of the holes in the example gas burner membrane of FIG. 6.
Figure 8:
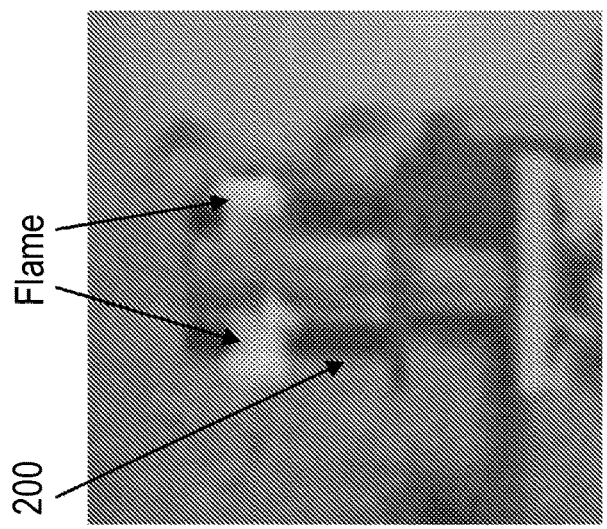
FIG. 8 shows an ultraviolet image of a hydrogen flame emitted from the gas burner membrane of FIG. 6, with no flashback, when the burner is used with hydrogen gas.

FIG. 3 shows part of a yet further typical gas burner 50 with the mixing chamber 12 with the burner membrane 14 on top. The mixing chamber 12 receives gas from a supply 16 via a pipe 21. A venturi 23 is provided at the mixing chamber 12 entrance, to cause the gas to accelerate prior to entering the mixing chamber 12. The pressure in a narrow passage of the venturi 23 is lower than atmospheric pressure, which causes air surrounding the venturi 23 to be sucked into the venturi 23 via apertures in the venturi 23, and then into the mixing chamber 12.

The gas burners 10, 50, 60 are intended to be used with gases such as hydrogen or hydrogen blend (greater than 80 vol. %) gas. Hydrogen has a greater flame velocity than natural gas, which increases the risk of flashback (i.e. an uncontrolled upstream propagation of the flame, due to a local imbalance in the flow velocity and the flame speed). If the exit velocity of an air/fuel mixture through the holes in a burner membrane is lower than the flame speed of hydrogen, there is a risk of flashback. Flashback can be explosive and thus dangerous, especially when hydrogen gas is used as a fuel. Increasing the air/hydrogen ratio can reduce the risk of flashback, but at the expense of combustion efficiency and flame stability.

It has been found that smaller holes in the burner membrane provide for a reduced risk of flashback and efficient burning when used with hydrogen gas or hydrogen blend gas. This is demonstrated by the examples of FIGS. 4 to 8, which show a first example natural gas burner membrane 100 and a second example burner membrane 200.

The first burner membrane 100 is formed from a 0.6 mm thickness stainless steel sheet 110, and includes holes 120 with a diameter of 0.8 mm. Flashback occurs when this burner membrane 100 is used with hydrogen gas.

The second burner membrane 200 is also formed from a 0.6 mm thickness stainless steel sheet 210, but includes holes 220 with a diameter of 0.5 mm. In this example the membrane 210 is curved, but in other embodiments the membrane may be flat. The holes 220 are formed by laser drilling, and are evenly spaced in a helical pattern in this example, but could be provided in other patterns in other examples. As demonstrated by the ultraviolet image of FIG. 8, which shows the (normally invisible) hydrogen flame only outside of the membrane, flashback does not occur when hydrogen is used as a fuel for the second burner membrane 200.

In view of this the burner membrane 14 has been formed with a required pattern of relatively small holes, which could be in accordance with the second burner membrane 200, or such holes could typically have a diameter of 0.1 mm, 0.25 mm, 0.5 mm, 0.75 mm or 1 mm. At least a majority of the holes may have a diameter equal to or less than 1.3 times the membrane thickness. In some examples at least the majority of the holes may have a diameter equal to or less than the membrane thickness, and in some examples at least the majority of the holes may have a diameter equal to or less than 0.75 times the membrane thickness.

Between 500 and 10000 holes are provided in the burner membrane 14. Preferably between 1000 and 2000 holes are provided.

The burner membrane 14 of FIGS. 1 to 3 is a single skin membrane and is formed from a sheet of metal, (e.g. ferritic stainless steel), which could for instance be 0.3 mm, 0.5 mm, 0.6 mm, 1.5 mm or 3 mm thick respectively for the hole sizes of 0.1 mm, 0.25 mm, 0.5 mm, 0.75 mm or 1 mm. In some, but not necessarily all examples, the burner membrane 14 of FIGS. 1 to 3 may be the same as the second burner membrane 200.

Holes of 0.5 mm cannot be formed by traditional sheet metal piercing techniques for a membrane 14 with a thickness of 0.6 mm, as the minimum size of the holes formable by these techniques is around 1.5 times the thickness of the sheet. In some instances using traditional sheet metal piercing techniques, it may be possible to produce holes at a size of 1.3 to 1.5 times the material thickness, but this is considered bad practice. Producing holes at sizes less than 1.3 times the material thickness would result in a high failure rate of the product or tooling. The holes in the first burner membrane 100 of FIGS. 4 & 5 were formed using traditional sheet metal piercing techniques. An option to provide smaller holes could be to reduce the thickness of the burner membrane 14, however this can adversely affect the structural integrity and/or life expectancy of the membrane 14.

A required pattern of small holes is provided in the sheet of metal of the membrane 14 using laser cutting, wherein one or more lasers are used to cut the sheet of metal. In some examples the laser cutting comprises laser drilling. The laser drilling could include single shot or single pulse laser cutting, where a single laser beam is pulsed onto the material to cause melting thereof, and formation of a required hole. Additionally or alternatively, multi beam laser drilling could be used to form the required holes. This is a simple but fast and efficient technique to provide a required pattern of small holes, within a short space of time. The holes in the second burner membrane 200 of FIGS. 6, 7 and 8 were formed using laser cutting.

Alternatively a required pattern of holes could be provided in the steel strip using a water jet cutter where a very high pressure jet of water, potentially with an abrasive substance included in the water, is fired in the required pattern at the strip. Using this technique means that no significant heat is produced during the cutting and there are therefore no thermal influences or contamination on the steel strip.

A further alternative is to provide the required pattern of holes in the strip of material using electron beam drilling as follows. Energy is created and focused precisely on the strip of metal to provide highly localised melting. Here an electrically heated cathode produces electrons that are accelerated by an electrical field applied between a cathode and an anode at a very high voltage. A modulating electrode controls the intensity of the electron beam which is focused on to the strip of material through an electromagnetic lens to power densities of 100 million watts or greater per square centimetre. The electron beam drilling can be used to provide a required pattern accurately and very quickly, and this process can for instance create a hole every single millisecond.

A yet further alternative is to provide the pattern of holes in in the strip of material using chemical etching as follows. The steel sheet is chemically cleaned and degreased to remove debris, waxes and rolling oils. A photosensitive resist is applied to one side of the sheet. Using laser direct imaging a pattern is formed on the sheet of exposed and unexposed photosensitive material, with the unexposed photosensitive material having the required pattern of holes. The laser direct imaging provides ultraviolet light to expose the photosensitive material other than that which provides the required pattern of holes.

The unexposed and thus unhardened photosensitive material is removed and etching is carried out as follows. Acid is sprayed on to the sheet, and etching takes place in the parts of the sheet not protected by the exposed photosensitive material. This provides a required pattern of holes, and the exposed photosensitive material is then removed from the strip to provide a burner membrane with a required pattern of holes.

Obviously the size, shape and pattern of holes can be chosen as required, and in use the burner membrane works well with a hydrogen rich gas to provide ignition immediately above the outer side of the burner membrane.

This method of forming a burner membrane therefore provides a burner membrane with a pattern of holes to enable use with gases such as hydrogen. This method can also be used to efficiently provide a number of such burner membranes in a bulk manufacturing process. The burner membrane can be used with pre-mix gas burners, post-mix gas burners or naturally aspirated gas burners.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of forming a single skin gas burner membrane, the method comprising forming a plurality of holes in a sheet of stainless steel, the holes being formed by laser cutting a required pattern of holes in the sheet of stainless steel, wherein at least a majority of the holes have a diameter equal to or less than the thickness of the sheet of stainless steel wherein the single skin gas burner membrane is arranged such that when fuel is passed through the plurality of holes, the fuel is ignited immediately adjacent an outer surface of the single skin gas burner membrane.

2. A method according to claim 1, wherein at least a majority of the holes have a diameter equal to or less than 0.75 times the thickness of the sheet of stainless steel.

3. A method according to claim 1, wherein at least a majority of the holes have a diameter of between 0.1 and 1 mm.

4. A method according to claim 1, wherein at least a majority of the holes have a diameter of between 0.25 and 0.75 mm.

5. A method according to claim 1, wherein the sheet of stainless steel has a thickness of between 0.3 and 3 mm.

6. A method according to claim 1, wherein the sheet of stainless steel has a thickness of between 0.4 and 1.5 mm.

7. A method according to claim 1, wherein the sheet of stainless steel has a thickness of substantially 0.6 mm.

8. A method according to claim 1, wherein the laser cutting comprises laser drilling.

9. A method according to claim 1, wherein the laser drilling of the required pattern of holes comprises at least one of: single beam laser drilling or multi beam laser drilling.

10. A method according to claim 1, wherein between 500 and 10000 holes are formed in the burner membrane.

11. A method according to claim 10, wherein between 1000 and 2000 holes are formed in the burner membrane.

12. A method according to claim 1, further comprising: providing a hydrogen gas supply to the burner membrane.

13. A method according to claim 12, wherein the hydrogen gas supply is a pure hydrogen gas supply or a hydrogen blend gas supply, wherein the hydrogen blend includes at least 80 vol. % hydrogen gas.

14. A single skin gas burner including:
a single skin gas burner membrane comprising a sheet of stainless steel with a plurality of holes, with at least a majority of the holes having a diameter equal to or less than 1.3 times the thickness of the sheet of stainless steel; and
a hydrogen gas supply,
wherein the single skin gas burner membrane is arranged such that when fuel is passed through the plurality of holes, the fuel is ignited immediately adjacent an outer surface of the single skin gas burner membrane.

15. A single skin gas burner according to claim 14, wherein the single skin gas burner further comprises a mixing chamber to receive gas from the hydrogen gas supply.

16. A single skin gas burner membrane comprising a sheet of stainless steel with a plurality of holes, with at least a majority of the holes having a diameter equal to or less than 1.3 times the thickness of the sheet of stainless steel, wherein the single skin gas burner membrane is arranged such that when fuel is passed through the plurality of holes, the fuel is ignited immediately adjacent an outer surface of the single skin gas burner membrane.

17. A single skin gas burner membrane according to claim 16, wherein at least a majority of the holes in the single skin gas burner membrane have a diameter of 0.1 mm to 1 mm.

* * * * *